US012811342B2

(12) United States Patent
Huang

(10) Patent No.: US 12,811,342 B2
(45) Date of Patent: Nov. 24, 2026

(54) PLUG CONNECTOR BUCKLE RELEASE MECHANISM AND THE MATCHING SOCKET CONNECTOR

(71) Applicant: ACES ELECTRONICS CO., LTD., Taoyuan City (TW)

(72) Inventor: Kuo-Hua Huang, Taoyuan City (TW)

(73) Assignee: ACES ELECTRONICS CO., LTD., Taoyuan City (TW)

( * ) Notice: Subject to any disclaimer, the term of this patent is extended or adjusted under 35 U.S.C. 154(b) by 363 days.

(21) Appl. No.: 18/659,647

(22) Filed: May 9, 2024

(65) Prior Publication Data

US 2025/0047038 A1 Feb. 6, 2025

(30) Foreign Application Priority Data

Aug. 2, 2023 (TW) ................................ 112208178

(51) Int. Cl.

| | |
|---|---|
| ***H01R 13/633*** | (2006.01) |
| ***H01R 12/79*** | (2011.01) |
| ***H01R 13/506*** | (2006.01) |
| ***H01R 13/627*** | (2006.01) |

(52) U.S. Cl.

CPC ......... *H01R 13/6335* (2013.01); *H01R 12/79* (2013.01); *H01R 13/506* (2013.01); *H01R 13/6275* (2013.01)

(58) Field of Classification Search

CPC .. H01R 13/6335; H01R 12/79; H01R 13/506; H01R 13/6275

See application file for complete search history.

(56) References Cited

U.S. PATENT DOCUMENTS

| | | | | |
|---|---|---|---|---|
| 11,735,866 B2 * | 8/2023 | Sun | H01R 13/6658 | |
| | | | 439/353 | |
| 12,609,496 B2 * | 4/2026 | Wu | H01R 12/73 | |
| 2010/0317218 A1 * | 12/2010 | Wu | H01R 13/6275 | |
| | | | 439/352 | |
| 2016/0079720 A1 * | 3/2016 | Zhong | H01R 24/66 | |
| | | | 439/660 | |
| 2018/0212364 A1 * | 7/2018 | Huang | H01R 13/26 | |
| 2021/0249816 A1 * | 8/2021 | Truong | H01R 13/6335 | |
| 2021/0265782 A1 * | 8/2021 | Wang | H01R 12/62 | |

(Continued)

*Primary Examiner* — Abdullah A Riyami
*Assistant Examiner* — Nader J Alhawamdeh
(74) *Attorney, Agent, or Firm* — MUNCY, GEISSLER, OLDS & LOWE, P.C.

(57) ABSTRACT

A plug connector buckle release mechanism and the matching socket connector are disclosed. When the plug connector is inserted into the socket connector to form an electrical connection, hook portions of two arms of the plug connector buckle release mechanism are snapped into respective positioning snap holes of the socket connector to form positioning. When unlocking, pull the pull strap of the plug connector buckle release mechanism to elastically deform two elastic members, causing the stepped push portions of the two arms to resist the push portions of the casing of the plug connector buckle release mechanism to elastically deflect downwards. At this time, the hook portions are detached from the positioning snap holes and lowered into respective through holes of the casing, so that the connector of the plug connector buckle release mechanism can be easily detached from the electrical connection of the socket connector.

12 Claims, 10 Drawing Sheets

(56) References Cited

U.S. PATENT DOCUMENTS

| | | | | |
|---|---|---|---|---|
| 2022/0021157 | A1* | 1/2022 | Sun | H01R 13/631 |
| 2024/0429656 | A1* | 12/2024 | Wu | H01R 12/73 |
| 2024/0429666 | A1* | 12/2024 | Wu | H01R 12/73 |
| 2025/0047038 | A1* | 2/2025 | Huang | H01R 13/6335 |
| 2025/0047039 | A1* | 2/2025 | Lai | H01R 13/6335 |

* cited by examiner

PLUG CONNECTOR BUCKLE RELEASE MECHANISM AND THE MATCHING SOCKET CONNECTOR

This application claims the priority benefit of Taiwan patent application number 112208178, filed on Aug. 2, 2023.

BACKGROUND OF THE INVENTION

1. Field of the Invention

The invention relates to a plug connector buckle release mechanism, and in particular to a plug connector provided with a buckle device and a casing for releasing on a corresponding socket connector through a pull strap to form a stable docking and easy separation operation.

2. Description of the Related Art

Nowadays, computer technology is developing at a rapid pace, and the development trend of computers is also moving towards strong computing power, fast speed and small size, and the number of computer communication ports is also reduced. This kind of communication ports can also be used with other devices with the same specifications, such as car audio, car computers, charging devices, satellite navigation, communication devices, etc. However, these devices contain communication port plugs, so the future development of such plugs with communication ports is also on the rise. However, with the improvement of technology in recent years, the size of plugs has become smaller and smaller. In terms of overall structural configuration, how to use good structural design to prevent the plug from directly pulling on the internal cable when plugging and unplugging, and to avoid the plug and socket connector being too small and easily damaged. In addition, without any support or fixed structure for the plug, it is easy for the plug to be pulled and fallen off after being inserted into the socket, thus affecting the signal transmission. Therefore, from the above detailed description, it can be found that when designing the plug, the main consideration can be to ensure the stability of the plug when docking with the socket connector. During the use of the plug, it should be avoided pulling on the wire to cause the plug to detach. Therefore, in view of the shortcomings of the above-mentioned conventional designs, it is necessary for relevant industries to conduct additional research and development to improve the shortcomings of the conventional designs.

Therefore, in view of the above-mentioned problems and deficiencies, the inventor collected relevant information, evaluated and considered many aspects, and used his many years of experience in this industry to design this kind of plug connector buckle release mechanism and the matching socket connector.

SUMMARY OF THE INVENTION

It is therefore the main object of the present invention to provide a plug connector buckle release mechanism comprising a connector, a buckle device and a casing. The connector comprises a base block and a mating terminal set mounted in the base block. The base block comprises a docking portion formed on a front side thereof and a mounting surface formed on an upper surface thereof at a rear side relative to the docking portion. The buckle device comprises a base slidingly installed on the mounting surface, two arms located on two opposite lateral sides of the base and extending in the same direction toward the docking portion. Each arm comprises a hook portion protruding upward from a suspended distal end thereof remote from the base, and a stepped push portion located on a top side thereof. The elastic portions with narrow longitudinal width are provided on the two sides of the base toward the front where the two arms are connected, two resisting portions bilaterally located on a bottom side of the base, and a pull strap combined with the base. The casing covers the base block. The casing comprises two through holes bilaterally located on a top surface thereof corresponding to the docking portion, two push portions bilaterally provided on an inner wall thereof and extending to a rear side of the stepped push portions, a beveled guide surface provided on the bottom of the push portions, and two elastic members respectively and integrally formed on the inner wall of the casing toward a rear side and extending downward and then obliquely bent toward the two opposite lateral sides of the casing. When pulling the pull strap, the buckle device makes the resisting portions displace and push against the elastic members to form elastic deformation, causing the stepped push portions of the two arms can be laterally limited by the push portions to elastically deflect downwards, so that the hook portions of the two arms are linked to elastically deflect downwards at the through holes.

It is another object of the present invention to provide a plug connector buckle release mechanism and a matching socket connector. The plug connector buckle release mechanism comprises a connector, a buckle device and a casing. The connector comprises a base block and a mating terminal set mounted in the base block. The base block comprises a docking portion formed on a front side thereof and a mounting surface formed on an upper surface thereof at a rear side relative to the docking portion. The buckle device comprises a base slidingly installed on the mounting surface, two arms located on two opposite lateral sides of the base and extending in the same direction toward the docking portion. Each arm comprises a hook portion protruding upward from a suspended distal end thereof remote from the base, and a stepped push portion located on a top side thereof. The elastic portions with narrow longitudinal width are provided on the two sides of the base toward the front where the two arms are connected, two resisting portions bilaterally located on a bottom side of the base, and a pull strap combined with the base. The casing covers the base block. The casing comprises two through holes bilaterally located on a top surface thereof corresponding to the docking portion, two push portions bilaterally provided on an inner wall thereof and extending to a rear side of the stepped push portions, a beveled guide surface provided on the bottom of the push portions, and two elastic members respectively and integrally formed on the inner wall of the casing toward a rear side and extending downward and then obliquely bent toward the two opposite lateral sides of the casing. When the docking portion of the connector of the present invention is inserted into the socket portion of the matching socket connector to form an electrical connection, the stepped push portions of the two arms are located on the front side of the push portions of the casing, and the hook portions of the two arms are maintained in an elastic pre-forced state and snap into respective positioning snap holes of the matching socket connector to form positioning. When pulling the pull strap to unlock, the buckle device makes the resisting portions displace and push against the elastic members to form elastic deformation, causing the stepped push portions of the two arms can be laterally limited by the push portions to elastically deflect downwards. At this time, the two hook portions are detached from the positioning snap holes of the matching socket connector and lowered into the through holes of the casing, so that the connector of the plug connector buckle release mechanism of the present invention can be easily detached from the electrical connection of the matching socket connector.

Still another object of the plug connector buckle release mechanism of the present invention is that the inner side of the casing is provided with the push portions on both lateral sides that extend forward to the rear side of the stepped push portions and then bend downward at an angle, and a curved surface is formed at the bottom of each push portion. When the pull strap is pulled to unlock, the stepped push portions of the two arms can be laterally limited by the push portions and move over the push portions along the curved surfaces to be placed under the push portions to form downward elastic deformation, so that the hook portions of the two arms are linked to elastically deflect downward at the through holes.

DETAILED DESCRIPTION OF THE PREFERRED EMBODIMENT

Figure 1:
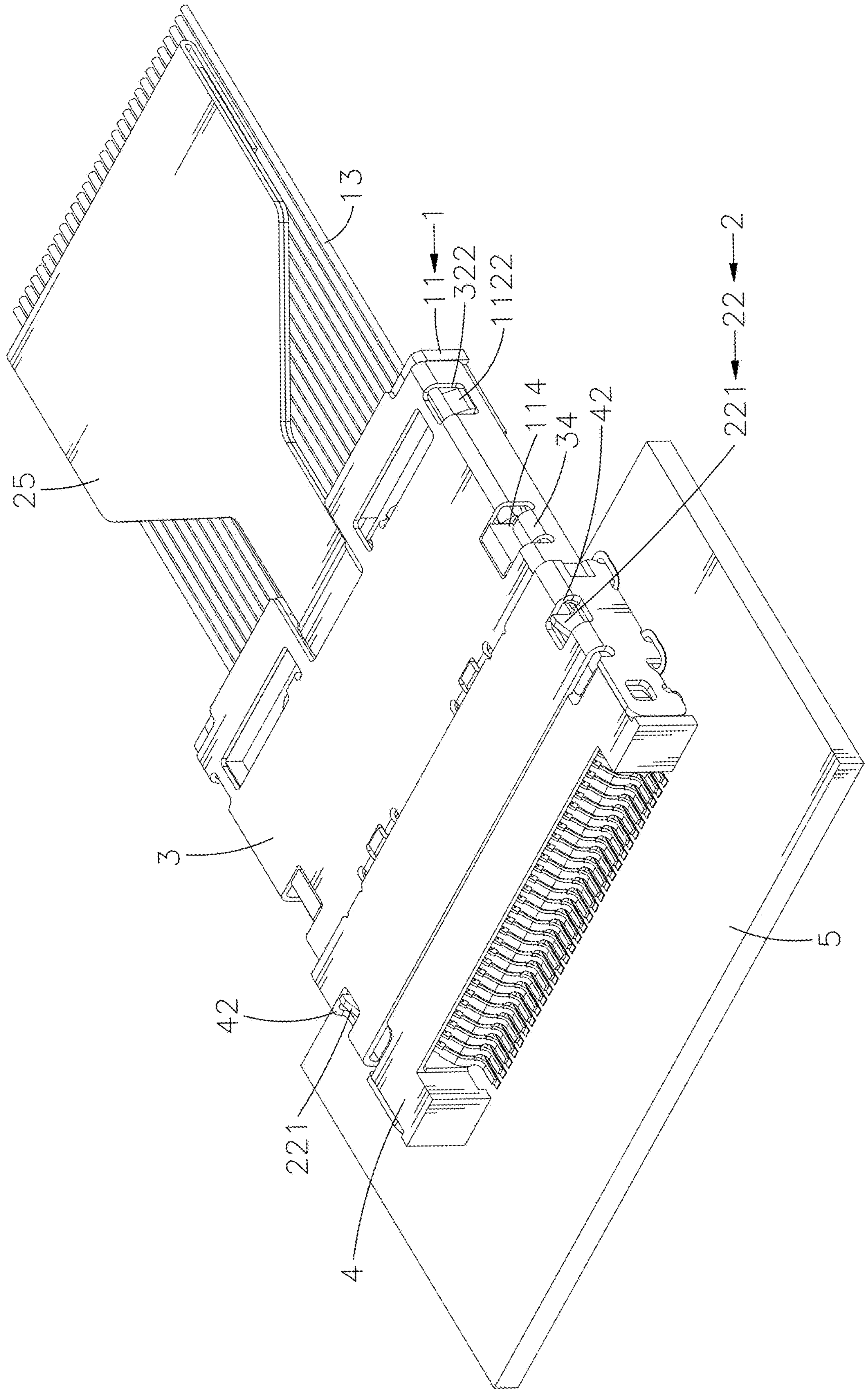
FIG. 1 is a three-dimensional appearance view of the present invention.

In order to achieve the above objects and effects, the technical means and structures adopted by the present invention are described in detail below with respect to the preferred embodiment of the present invention in companying with the drawings, so as to facilitate a complete understanding.

Please refer to FIGS. 1-5, which are three-dimensional appearance view of the present invention, three-dimensional appearance view of the connector of the present invention before docking, three-dimensional exploded view of the present invention, three-dimensional exploded view of the present invention from another perspective and three-dimensional appearance view of the casing of the present invention from another perspective. The plug connector buckle release mechanism and the matching socket connector of the present invention mainly comprises a connector 1, a buckle device 2 and a casing 3.

The connector 1 comprises a base block 11, and a mating terminal set 12 equipped with a circuit board 5 and welded with wires 13 is mounted in the base block 11. The base block 11 comprises a docking portion 111 formed on the front side thereof, a mounting surface 110 provided on the upper surface thereof and extending from the docking portion 111 toward the rear side thereof, two mounting structures 112 respectively formed on the two opposite lateral sides of the mounting surface 110. Each mounting structure 112 is provided with a buckling portion 1121 and a first positioning portion 1122 protruded sequentially from the docking portion 111 toward the rear side, at least one second positioning portion 113 provided at a top edge of the base block 11 at a front side of the mounting surface 110, and two grooves 114 respectively provided on the two opposite lateral sides of the base block 11 at a front side of the mounting surface 110 and on the rear side of the docking portion 111.

The buckle device 2 comprises a base 21 slidably mounted on the mounting surface 110, two arms 22 respectively located on the two opposite lateral sides of the base 21 and extending in the same direction toward the docking portion 111. Each arm 22 comprises a hook portion 221 protruding upward from the suspended distal end thereof remote from the base 21, an elastic portion 222 with a narrow longitudinal width are provided on the two sides of the base 21 toward the front where the two arms 22 are connected, and a stepped push portion 223 located on the top side of the each arm 22 between the rear side of the hook portion 221 and the front side of the elastic portion 222. Two resisting portions 23 respectively located on the opposite side of the bottom side of the base 21, an opening 24 provided on the base 21, and a pull strap 25 combined with the opening 24.

The casing 3 covers the base block 11. The casing 3 comprises two through holes 31 respectively located on the top surface thereof corresponding to the two opposite lateral sides of the docking portion 111, two limiting portions 32 respectively formed on the two opposite lateral sides thereof, a buckling portion 321 bent at an angle toward an inner side located on the bottom side of each limiting portion 32, a first positioning hole 322 provided on the lateral side of each two limiting portion 32 facing backward, at least one second positioning hole 33 provided on the top edge of the casing 3 facing forward, two push portions 34 bilaterally provided on the inner wall of the casing 3 and extending in direction toward each other and respectively placed behind the stepped push portions 223, a beveled guide surface 341 provided on one end of the bottom side of the front side of each push portion 34, and two elastic members 35 respectively and integrally formed on the inner wall of the casing 3 facing the rear side and extending downward and then obliquely bent toward the two opposite lateral sides of the casing 3.

Furthermore, when constructing the present invention, the pull strap 25 is first wound and fixed at the opening 24 of the buckle device 2, and then the base 21 of the buckle device 2 is placed on the mounting surface 110 of the base block 11, so that the two arms 22 are respectively installed on both sides of the base block 11, and the stepped push portions 223 of the two arms 22 are transversely aligned with the grooves 114 of the base block 11, and then the casing 3 is covered on the top side of the base block 11. At this time, each buckling portion 321 of the casing 3 is fastened to the buckling portions 1121 of the base block 11 to form positioning, the first positioning holes 322 are respectively fastened to the first positioning portion 1122 to form positioning, the second positioning hole 33 is fastened to the second positioning portion 113 to form positioning, so that the casing 3 is firmly positioned on the top side of the buckle device 2 and the base block 11. At the same time, the push portions 34 of the casing 3 respectively extend into the grooves 114 of the base block 11 and are located behind the stepped push portions 223 of the two arms 22, and the suspended ends of the integrated elastic members 35 of the casing 3 are respectively pressed against the resisting portions 23 of the buckle device 2, so that the two hook portions 221 are located on both sides of the base block 11 and pass through the through holes 31 on the top surface of the casing 3, thereby completing the overall structure of the plug connector of the present invention.

Figure 2:
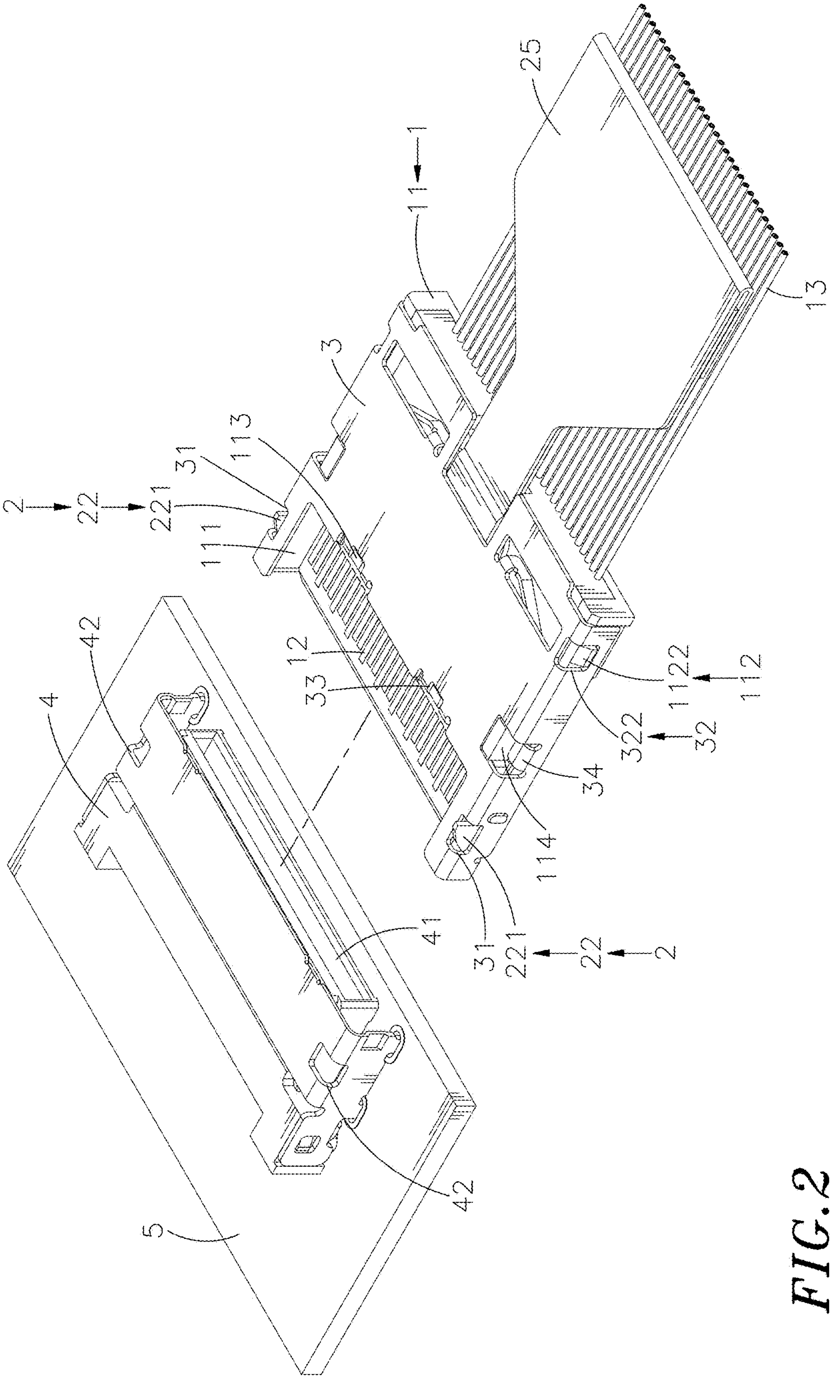
FIG. 2 is a three-dimensional appearance view of the connector of the present invention before docking.
Figure 3:
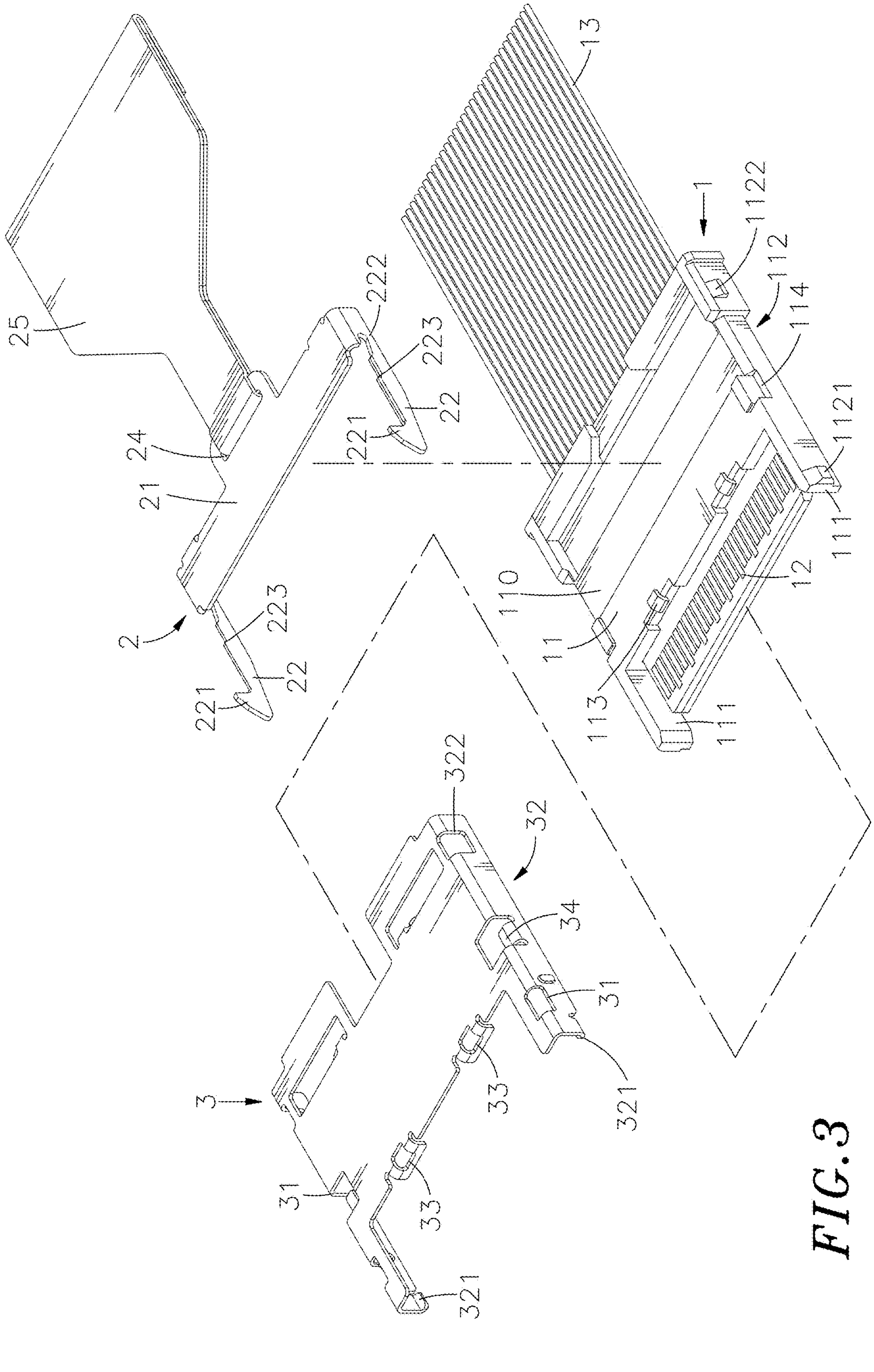
FIG. 3 is a three-dimensional exploded view of the present invention.
Figure 4:
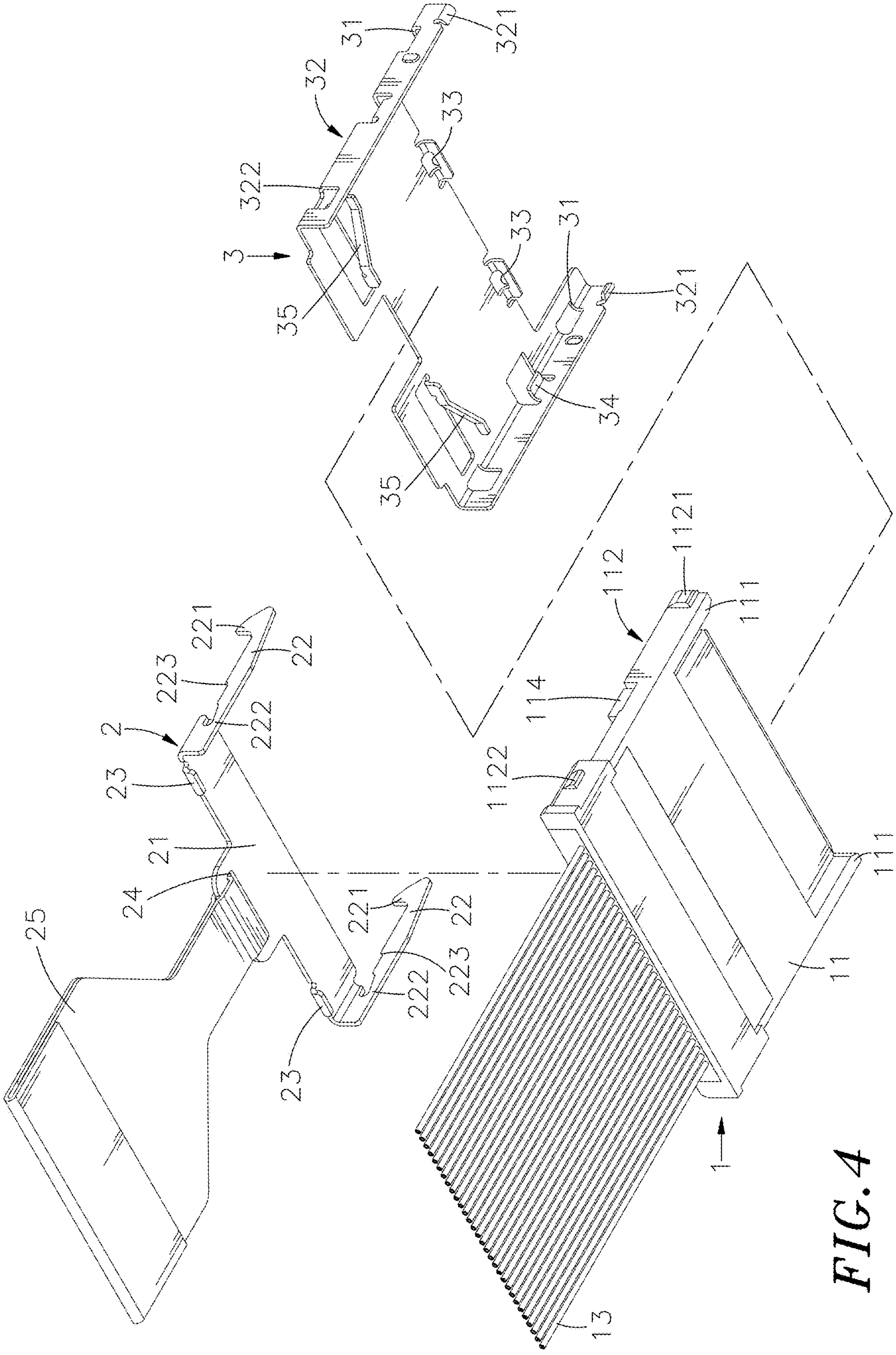
FIG. 4 is a three-dimensional exploded view of the present invention from another perspective.
Figure 5:
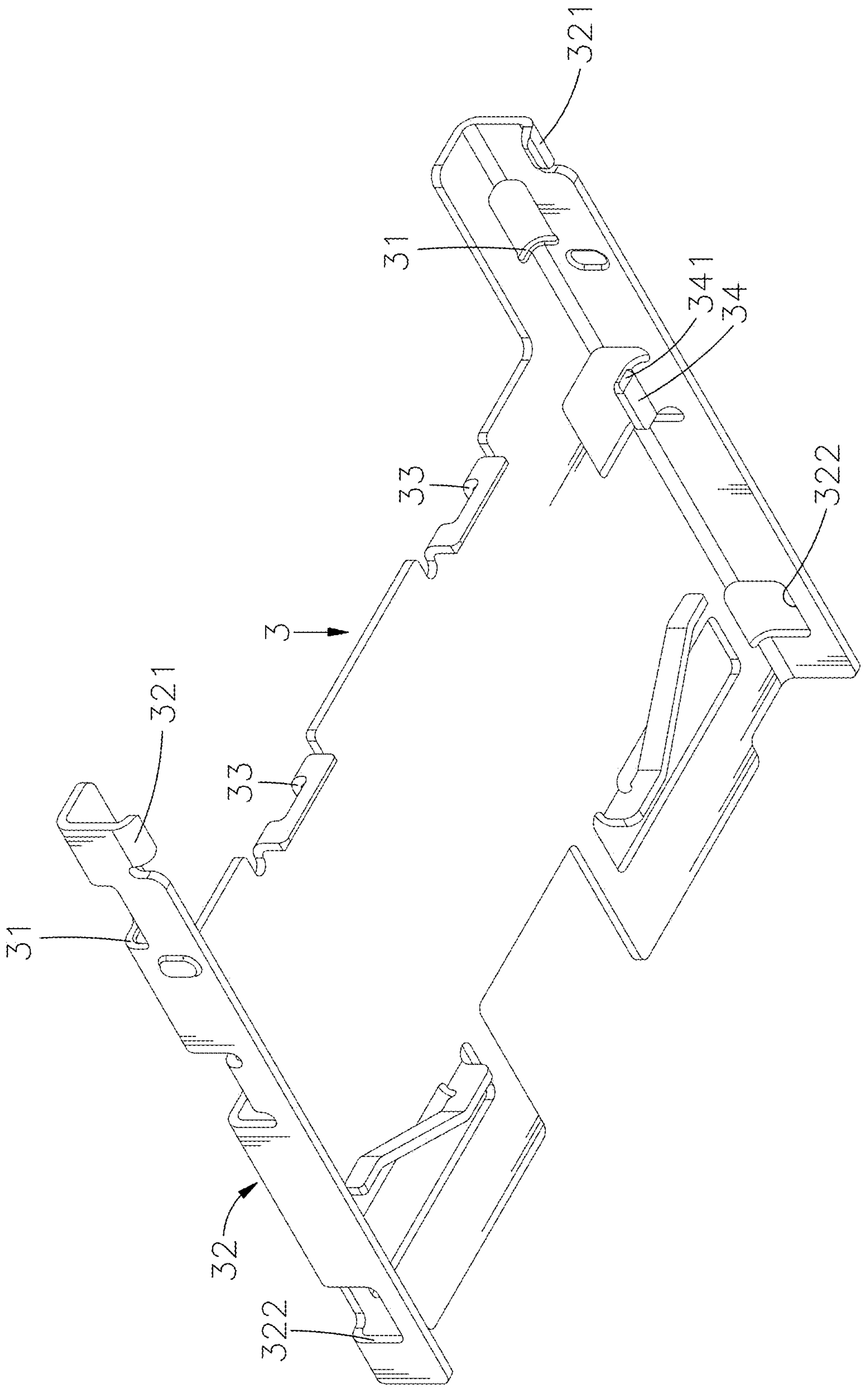
FIG. 5 is a three-dimensional appearance view of the casing of the present invention from another perspective.
Figure 6:
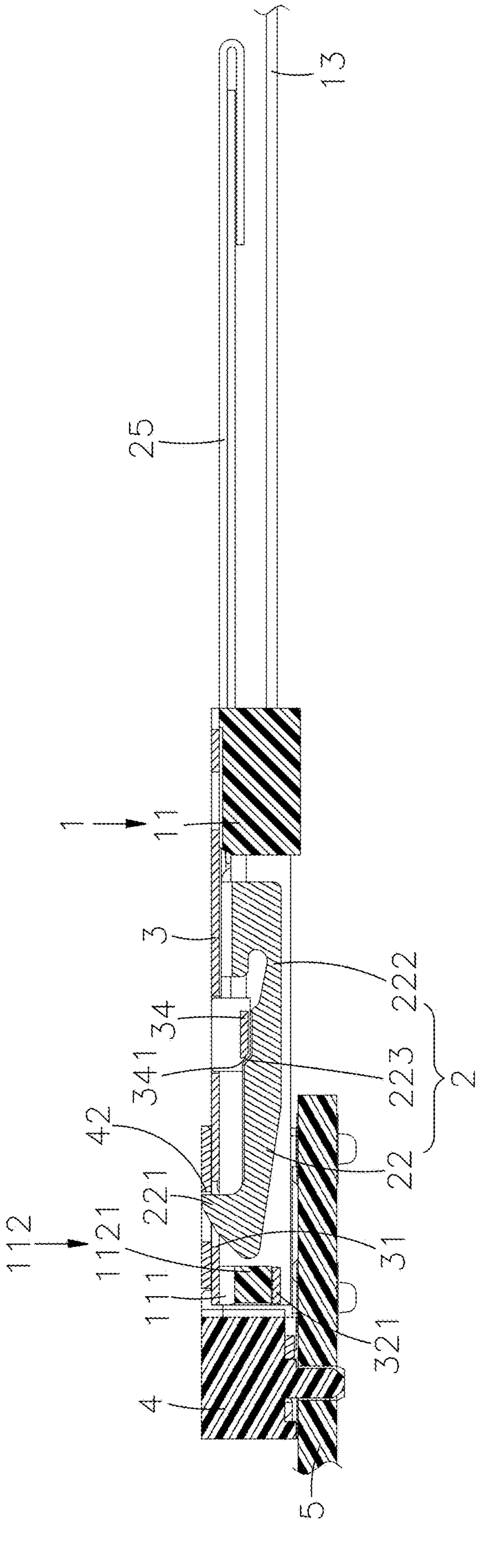
FIG. 6 is a side cross-sectional view of the present invention, showing the hook portion of the buckle device hooked in the respective hook hole of the socket portion of the socket connector.
Figure 7:
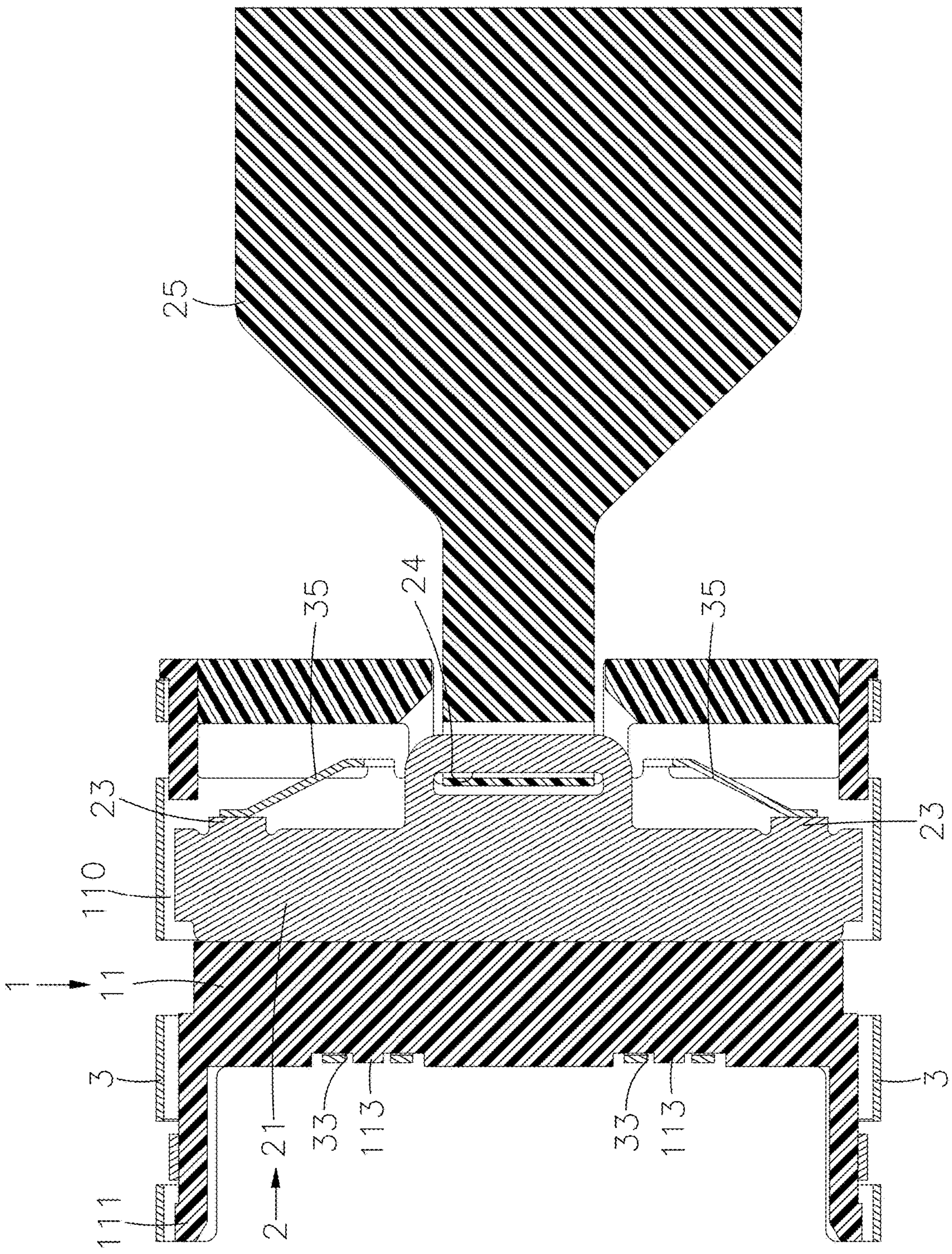
FIG. 7 is a top cross-sectional view of the elastic members of the casing of the present invention.

Please continue to refer to FIGS. 1 and 2, which are three-dimensional appearance view of the present invention and three-dimensional appearance view of the connector of the present invention before docking. As shown in the drawings, it can be clearly seen that the matching socket connector 4 is welded on a circuit board 5, comprising a socket portion 41 and two positioning snap holes 42 bilaterally located on the top surface of the socket portion 41 for the hook portions 221 of the two arms 22 to nap into the positioning snap holes 42 respectively.

Please continue to refer to FIGS. 1 and 2, which are three-dimensional appearance view of the present invention and three-dimensional appearance view of the connector of the present invention before docking. As shown in the drawings, it can be clearly seen that when locking the present invention, the docking portion 111 of the connector 1 of the present invention is first inserted into the socket portion 41 of the matching socket connector 4 to make an electrical connection. At this time, the hook portions 221 of the two arms 22 are in an elastic holding state, and respectively snap into the positioning snap holes 42 to form positioning.

Please continue to refer to FIGS. 1, 2, 6 and 7, which are three-dimensional appearance view of the present invention, three-dimensional appearance view of the connector of the present invention before docking, side cross-sectional view of the present invention, showing the hook portion of the buckle device hooked in the respective hook hole of the socket portion of the socket connector and top cross-sectional view of the elastic members of the casing of the present invention. As shown in the drawings, it can be clearly seen that when unlocking the present invention, the pull strap 25 at the opening 24 is pulled to cause the displacement of the resisting portions 23 of the buckle device 2 to push against the suspended ends of the elastic members 35 of the casing 3 to produce squeezed elastic deformation on the mounting surface 110, and to make the stepped push portions 223 of the two arms 22 of the buckle device 2 touch the front edges of the push portions 34 of the casing 3 to form a lateral limit, so that the stepped push portions 223 are moved over the push portions 34 along the beveled guide surfaces 341 and placed under the push portions 34 to form a downward deflection, so that the two arms 22 of the buckle device 2 can be elastically deflected downward by a distance on both sides of the base block 11 by using the elastic portions 222 as the fulcrum. Thus, the two arms 22 link the hook portions 221 to elastically deflect downward by a distance, so that the hook portions 221 can be separated from the positioning snap holes 42 of the socket portion 41 of the matching socket connector 4, and can descend into the through holes 31 of the casing 3. This method can also make the connector 1 easily disconnected from the electrical connection of the matching socket connector 4.

In addition, in the embodiment of the present invention, two elastic members 35 are respectively and integrally formed on the inner wall of the casing 3 toward the rear side and extending downwards and are obliquely bent toward the two lateral sides of the casing 3. However, the number of the elastic members 35 can be set to at least one. The casing 3 can use the elastic members 35 with elastic displacement to make the buckle device 2 form a limited slip state. The elastic members 35 extending obliquely can also be a continuously bent shape. Therefore, the elastic members 35 only need to be in a state of the elastic deformation and reset function. Such simple equivalent changes and modifications do not limit the scope of protection of the present invention, and are hereby stated.

In addition, in the embodiment of the present invention, the center of the docking portion 111 of the connector 1 is a circuit board-type mating terminal set 12, so that the mating terminal set 12 can be used as an electrical connection with the matching socket connector 4. Therefore, the mating terminal set 12 in the docking portion 111 of the connector 1 is not necessarily designed in the type of a circuit board 5, but can also be designed as a cable-connected plug or socket in the form of other a plurality of terminals or conductive sheets. Such simple equivalent changes and modifications do not limit the scope of protection of the present invention. Such simple equivalent changes and modifications should still be included in the patent scope covered by the present invention.

Figure 8:
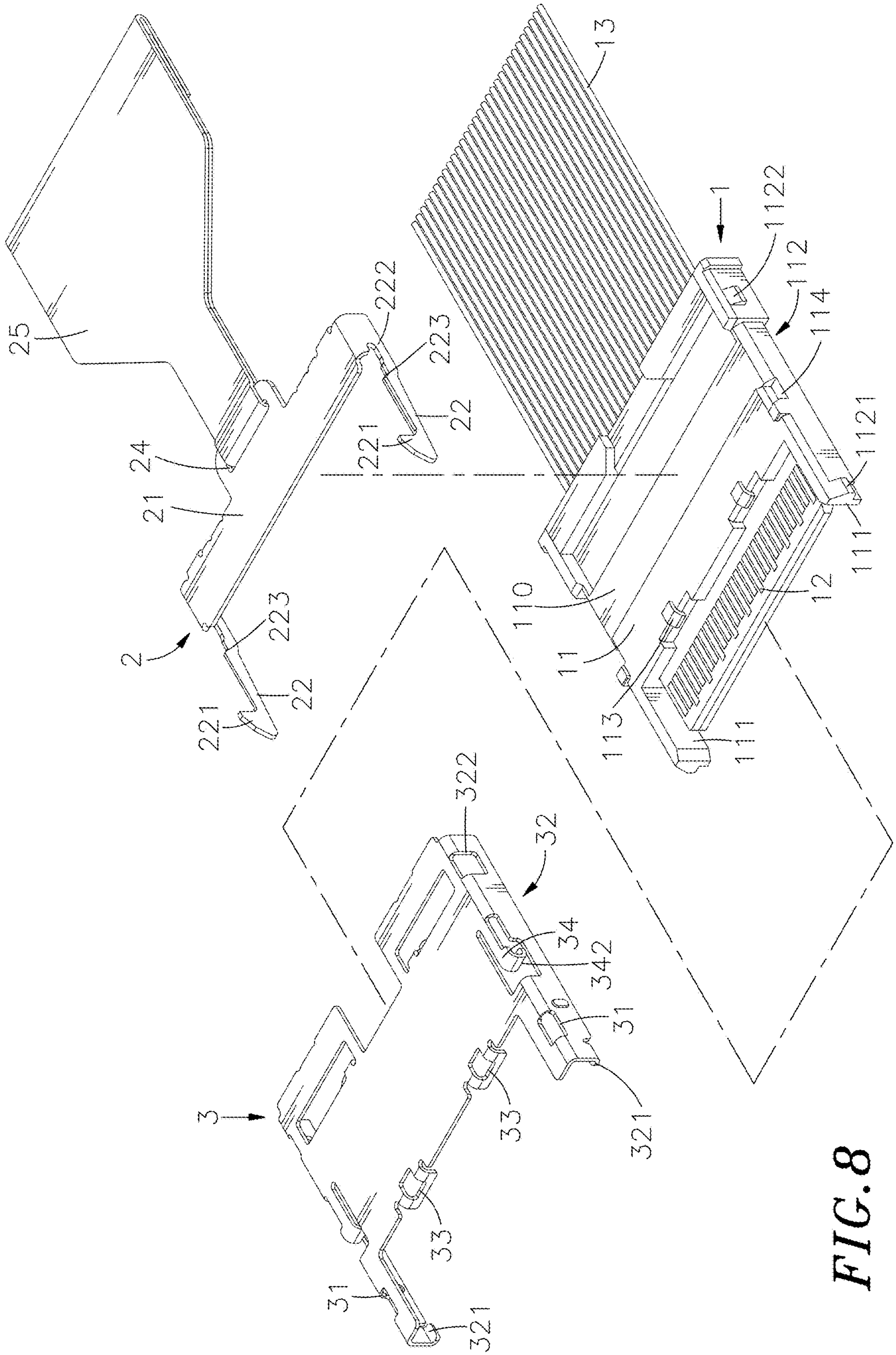
FIG. 8 is a three-dimensional exploded view of the second embodiment of the present invention.
Figure 9:
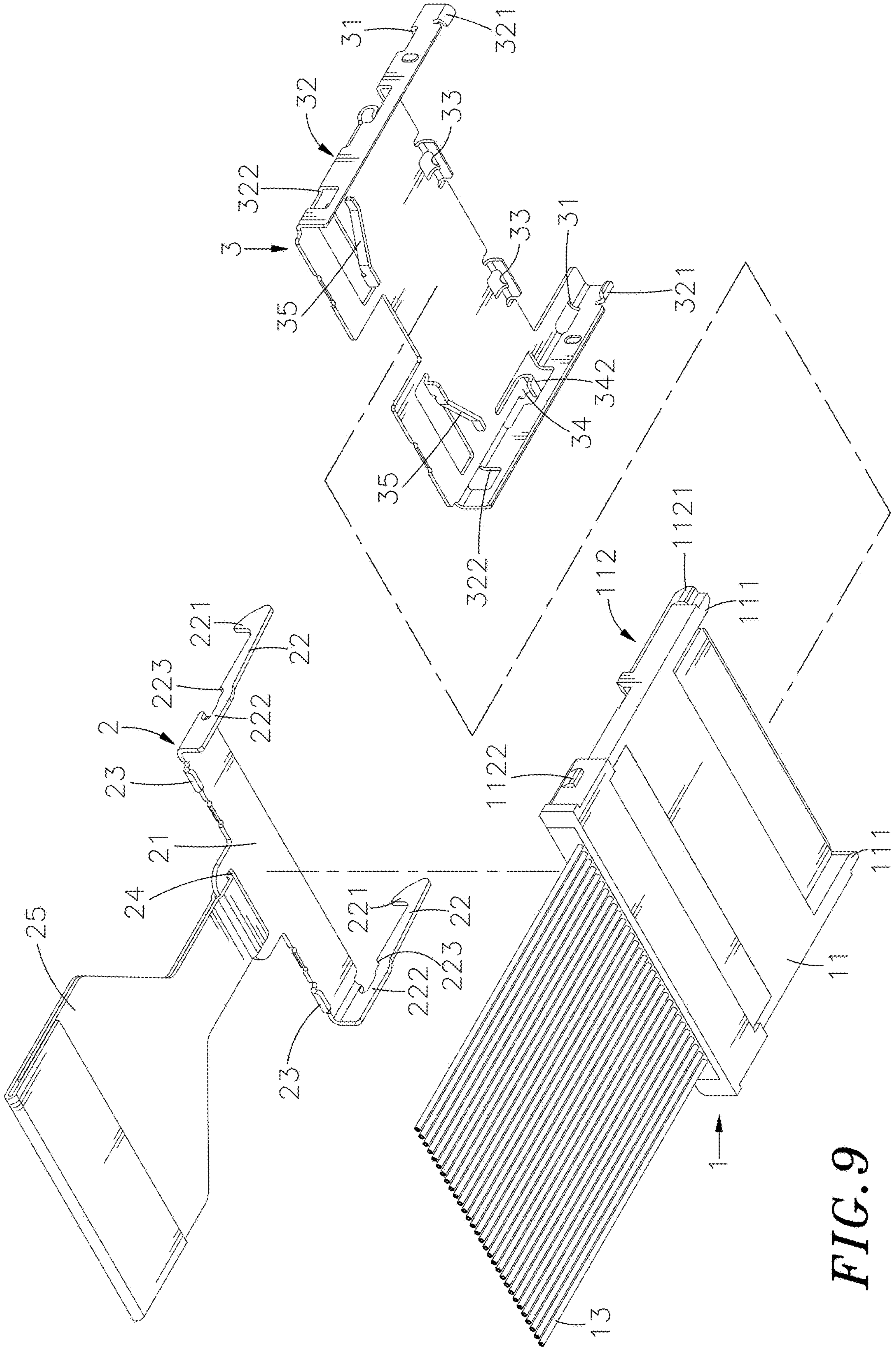
FIG. 9 is a three-dimensional exploded view from another perspective of the second embodiment of the present invention.
Figure 10:
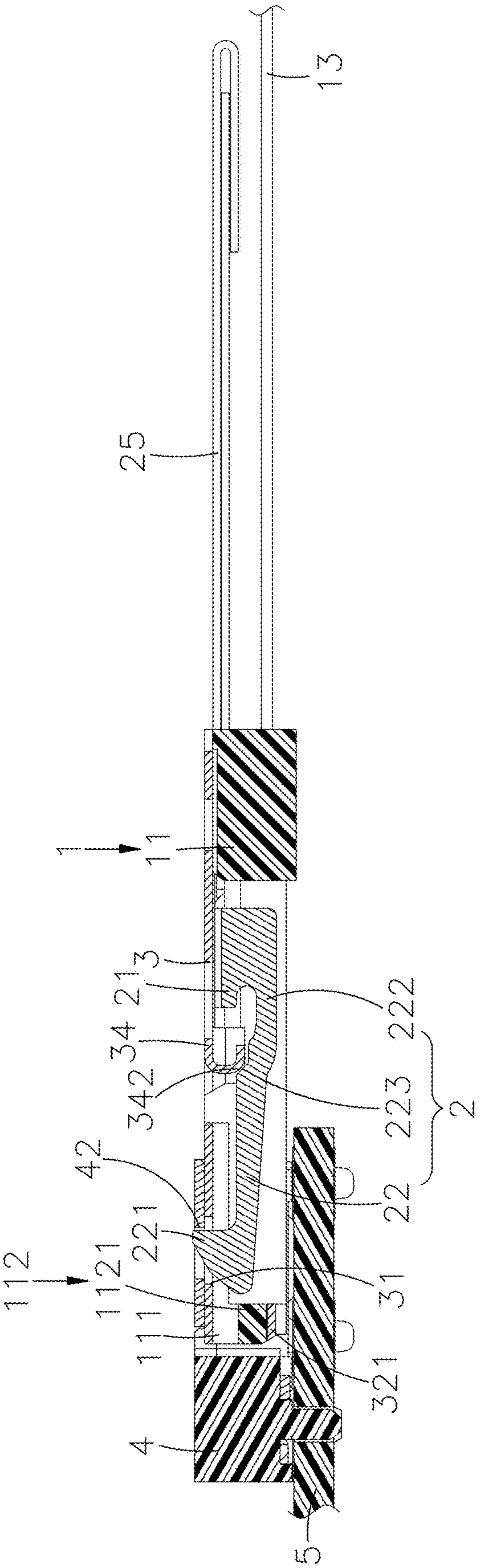
FIG. 10 is a side cross-sectional view of the second embodiment of the present invention, showing the hook portion of the buckle device hooked in the respective hook hole of the socket portion of the socket connector.

Please continue to refer to FIGS. 8 to 10, which are three-dimensional exploded view of a second embodiment of the present invention, three-dimensional exploded view from another perspective of the second embodiment of the present invention and side cross-sectional view of the second embodiment of the present invention, showing the hook portion of the buckle device hooked in the respective hook hole of the socket portion of the socket connector. As shown in the drawings, it can be clearly seen that the main difference between the aforesaid first embodiment and this second embodiment of the present invention is that the casing 3 comprises two push portions 34 respectively and bilaterally formed on the inner wall and extending forward to the rear side of the stepped push portions 223 and then bent downward at an angle, and a curved surface 342 is formed at the bottom of the front side of each push portion 34. When unlocking the second embodiment of the present invention, the pull strap 25 at the opening 24 is pulled to cause the displacement of the resisting portions 23 of the buckle device 2 to push against the suspended ends of the elastic members 35 of the casing 3 to produce squeezed elastic deformation on the mounting surface 110, and to make the stepped push portions 223 of the two arms 22 of the buckle device 2 touch the front edges of the push portions 34 of the casing 3 to form a lateral limit, so that the stepped push portions 223 are moved over the push portions 34 along the curved surfaces 342 and placed under the push portions 34 to form a downward deflection, so that the two arms 22 of the buckle device 2 can be elastically deflected downward by a distance on both sides of the base block 11 by using the elastic portions 222 as the fulcrum. Thus, the two hook portions 221 can be separated from the positioning snap holes 42 of the socket portion 41 of the matching socket connector 4, and can descend into the through holes 31 of the casing 3. This method can also make the connector 1 easily disconnected from the electrical connection of the matching socket connector 4.

In addition, the push portions 34 of the first embodiment and the second embodiment of the present invention extend into the grooves 114 for the stepped push portions 223 of the two arms 22 to touch and move over the push portions 34 to be placed below the push portions 34, so that the two arms 22 of the buckle device 2 are elastically deflected downward by a distance on both sides of the base block 11 through the elastic portions 222 as the fulcrum. The push portions 34 can also be protrusions formed on the inner wall of the casing 3 and extending into the grooves 114, or protrusions can be protrusions on the two sides of the base block 11 and protruding from the stepped push portions 223 of the two arms 22 to provide the designs of the elastic deformation and reset function for the stepped push portions 223 of the two arms 22. Moreover, by extending the push portions 34 into the grooves 114, the contact area of the stepped push portions 223 is increased, so as to prevent the two arms 22 from being skewed during operation to cause inaccurate movement. Therefore, the push portions 34 do not necessarily need the design of the grooves 114, and can also be directly pressed against the two lateral side surfaces of the base block 11. Such simple equivalent changes and modifications do not limit the scope of protection of the present invention. Such simple equivalent changes and modifications should still be included in the patent scope covered by the present invention.

In addition, the stepped push portions 223 are provided between the hook portions 221 and the elastic portions 222 of the buckle device 2 and at the top side of the two arms 22. The stepped push portions 223 can also be in the form of protrusions or inclines, so that when actuating, they resist the push portions 34 to link the two arms 22 to produce displacement, so that the two arms 22 form the elastic deformation and reset function. Moreover, the elastic portions 222 with narrow longitudinal width are provided on the two sides of the base 21 toward the front where the two arms 22 are connected. The elastic portions 222 can also be set in a lateral bending or other forms to make the two arms 22 can elastically deflect downward by a distance on both sides of the base block 11 through the elastic portions 222 as a fulcrum, so that the two arms 22 can form the elastic deformation and reset function. Such simple equivalent changes and modifications do not limit the scope of protection of the present invention. Such simple equivalent changes and modifications should still be included in the patent scope covered by the present invention.

In addition, when the first and second embodiments of the present invention are unlocked multiple times, if the pull strap 25 is detached or broken at the joint, a flat preset hand tool or any preset tools can be used and inserted into the opening 24 and pushed backward, the same unlocking action as pulling the pull strap 25 can be produced to separate the connector 1 from the electrical connection of the matching socket connector 4.

In addition, the present invention is mainly aimed at pulling the pull strap 25, so that the two arms 22 of the buckle device 2 can move over the push portions 34 of the casing 3 to produce a downward elastic deflection, and the hook portions 221 of the two arms 22 can be elastically deflected downward by a distance, which is a main feature of the present invention. This achieves the effect of the base block 11 of the connector 1 forming a stable connection with the matching socket connector 4 and ensuring accurate action.

The above description is only the preferred embodiments of the present invention, and does not limit the patent scope of the present invention. Therefore, all simple modifications and equivalent structural changes made by using the description and drawings of the present invention shall be included in the patent scope of the present invention and shall be clearly stated.

To sum up, when the plug connector buckle release mechanism and the matching socket connector of the present invention are used, they can indeed achieve their effects and purposes. Therefore, the present invention is truly an invention with excellent practicality. In order to meet the application requirements for an invention patent, I filed the application in accordance with the law and hope that the review committee will approve the case as soon as possible to protect the inventor's hard work. If the review committee has any doubts, please feel free to send us a letter for instructions. The inventor will do our best to cooperate. We sincerely appreciate it.

What the invention claimed is:

1. A plug connector buckle release mechanism, comprising a connector, a buckle device and a casing, wherein: said connector comprises a base block and a mating terminal set mounted in said base block, said base block comprising a docking portion formed on a front side thereof and a mounting surface formed on an upper surface thereof at a rear side relative to said docking portion; said buckle device comprises a base slidingly installed on said mounting surface, two arms located on two opposite lateral sides of said base and extending in the same direction toward said docking portion, each said arm comprising a hook portion protruding upward from a suspended distal end thereof remote from said base, a stepped push portion located on a top side of said arm; and two resisting portions bilaterally located on a bottom side of said base and a pull strap combined with said base, said casing covers said base block, said casing comprising two through holes bilaterally located on a top surface thereof corresponding to said docking portion, two push portions bilaterally provided on an inner wall thereof and extending to a rear side of said stepped push portions and two elastic members bilaterally formed on the inner wall of said casing toward a rear side to resist said resisting portions for elastic displacement; and wherein pulling said pull strap drives said buckle device to elastically deform said elastic members, causing said stepped push portions to resist said push portions to elastically deflect downwards, so that said hook portions of two said arms are linked to elastically deflect downwards at said through holes.

2. The plug connector buckle release mechanism as claimed in claim 1, wherein said base block further comprises two mounting structures respectively formed on two opposite lateral sides of said mounting surface; said casing further comprises two limiting portions respectively formed on two opposite lateral sides thereof and corresponding to each said mounting structure to resist for positioning.

3. The plug connector buckle release mechanism as claimed in claim 2, wherein each said mounting structure of said casing comprises a buckling portion protruding outward from respective one lateral side of said ducking portion; said casing further comprises two buckling portions respectively located on a bottom side of two said limiting portions and bent at an angle toward an inner side for buckling and positioning.

4. The plug connector buckle release mechanism as claimed in claim 2, wherein each said mounting structure comprises a first positioning portion protruding outward from respective one lateral side of said base block; said casing further comprises two first positioning holes provided on a rear side relative to two said limiting portions for engagement with said first positioning portions.

5. The plug connector buckle release mechanism as claimed in claim 1, wherein said base block further comprises at least one second positioning portion provided at a top edge of said base block at a front side of said mounting surface; said casing further comprises at least one second positioning hole located on a top edge thereof and facing forward for engagement with said at least one second positioning portion.

6. The plug connector buckle release mechanism as claimed in claim 1, wherein said base block further comprises two grooves respectively provided on two opposite lateral sides thereof on a front side of said mounting surface and on a rear side of said docking portion for said push portions of said casing extending into.

7. The plug connector buckle release mechanism as claimed in claim 1, wherein two said elastic members are respectively and integrally formed on the inner wall of said casing toward a rear side and extending downward then obliquely bent toward two lateral sides of said casing; two said resisting portions are bilaterally located on the bottom side of said base of said buckle device to press against respective suspended ends of said elastic members.

8. The plug connector buckle release mechanism as claimed in claim 1, wherein said buckle device further comprises an opening located on said base for said pull strap to be combined.

9. The plug connector buckle release mechanism as claimed in claim 1, wherein each said arm further comprises an elastic portion with a narrow longitudinal width connected to said base of said buckle device.

10. The plug connector buckle release mechanism as claimed in claim 1, wherein each said push portion of said casing has a beveled guide surface provided on a bottom side thereof.

11. The plug connector buckle release mechanism as claimed in claim 1, wherein each said push portion of said casing has a curved surface provided on a bottom side thereof.

12. A socket connector matching up with the plug connector buckle release mechanism as claimed in claim 1, said socket connector comprising a socket portion for said docking portion of the connector of said plug connector buckle release mechanism to be plugged into to form an electrical connection, and two positioning snap holes respectively located on the top surfaces of said socket portion at two opposite lateral sides for said hook portions of said arms to buckle and position.

* * * * *